(12) United States Patent
Chen et al.

(10) Patent No.: US 10,843,573 B2
(45) Date of Patent: Nov. 24, 2020

(54) CHARGING STATION AND CHARGING STATION MODULE

(71) Applicant: Industrial Technology Research Institute, Hsinchu (TW)

(72) Inventors: Yung-Chao Chen, Taichung (TW); Chien-Hung Lin, Hsinchu County (TW); Yu-Sheng Lee, Kaohsiung (TW); Tsung-Hsien Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 383 days.

(21) Appl. No.: 15/820,447

(22) Filed: Nov. 22, 2017

(65) Prior Publication Data

US 2018/0178665 A1 Jun. 28, 2018

Related U.S. Application Data

(60) Provisional application No. 62/439,160, filed on Dec. 27, 2016.

(30) Foreign Application Priority Data

Sep. 11, 2017 (TW) .............................. 106131000 A (51) Int. Cl.
*H02J 7/00* (2006.01)
*B60L 11/18* (2006.01)
(Continued)

(52) U.S. Cl.
CPC ........... *B60L 11/1825* (2013.01); *B60L 53/16* (2019.02); *B60L 53/18* (2019.02); *B60L 53/31* (2019.02);
(Continued)

(58) Field of Classification Search
USPC ......................................................... 320/109
See application file for complete search history.

(56) References Cited

U.S. PATENT DOCUMENTS 5,272,431 A * 12/1993 Nee ....................... B60L 3/0023
320/109
9,266,440 B2  2/2016 Gao et al.
(Continued)

FOREIGN PATENT DOCUMENTS

CN        201937291       8/2011
CN        204103546       1/2015
(Continued)

OTHER PUBLICATIONS

"Office Action of Taiwan Counterpart Application" , dated Aug. 3, 2018, p. 1-p. 8.
(Continued)

*Primary Examiner* — Samuel Berhanu
(74) *Attorney, Agent, or Firm* — JCIPRNET (57) ABSTRACT

A charging station is provided herein for being adapted to bear an unmanned vehicle. The charging station includes a platform and a charging mechanism. The charging mechanism is disposed on the platform, and the charging mechanism may be electrically connected to the unmanned vehicle for charging by a movement over the platform. In addition, a charging station module including a plurality of the aforesaid charging stations is also provided.

19 Claims, 7 Drawing Sheets

(51) Int. Cl.
  *B64C 39/02* (2006.01)
  *B60L 53/18* (2019.01)
  *B64F 1/00* (2006.01)
  *B60L 53/31* (2019.01)
  *B60L 53/16* (2019.01)

(52) U.S. Cl.
  CPC ............ *B64C 39/024* (2013.01); *B64F 1/007* (2013.01); *H02J 7/0027* (2013.01); *H02J 7/0042* (2013.01); *H02J 7/0044* (2013.01); *B60L 2200/10* (2013.01); *B64C 2201/027* (2013.01); *B64C 2201/042* (2013.01); *B64C 2201/108* (2013.01); *Y02T 10/70* (2013.01); *Y02T 10/7072* (2013.01)

(56) References Cited

U.S. PATENT DOCUMENTS

| | | | |
|---|---|---|---|
| 9,387,928 | B1 | 7/2016 | Gentry et al. |
| 9,440,545 | B2 | 9/2016 | Wang |
| 9,551,989 | B2 | 1/2017 | Scarlatti et al. |
| 9,573,701 | B2 | 2/2017 | Beardsley et al. |
| 2013/0079962 | A1* | 3/2013 | Ishikawa ............. B60L 15/2045 701/22 |
| 2014/0062384 | A1* | 3/2014 | Niizuma ................. B60L 5/005 320/104 |
| 2015/0314453 | A1* | 11/2015 | Witelson ................. H02J 50/90 320/108 |
| 2016/0336772 | A1 | 11/2016 | Dallachiesa et al. |
| 2017/0217323 | A1* | 8/2017 | Antonini ................. B64C 25/52 |

FOREIGN PATENT DOCUMENTS

| | | |
|---|---|---|
| CN | 205051397 | 2/2016 |
| CN | 205212489 | 5/2016 |
| CN | 205345358 | 6/2016 |
| CN | 105896673 | 8/2016 |
| CN | 106026313 | 10/2016 |
| CN | 104753144 | 11/2016 |
| CN | 106103281 | 11/2016 |
| CN | 106114886 | 11/2016 |
| CN | 106130108 | 11/2016 |
| CN | 106130113 | 11/2016 |
| TW | M483451 | 8/2014 |
| TW | M507291 | 8/2015 |
| TW | M509068 | 9/2015 |
| WO | 2016019978 | 2/2016 |

OTHER PUBLICATIONS

"Office Action of China Counterpart Application", dated Feb. 3, 2020, pp. 1-11.

* cited by examiner

CHARGING STATION AND CHARGING STATION MODULE

CROSS-REFERENCE TO RELATED APPLICATION

This application claims the priority benefit of U.S. provisional application Ser. No. 62/439,160, filed on Dec. 27, 2016 and claims the priority benefit of the Taiwan application serial no. 106131000, filed on Sep. 11, 2017. The entirety of each of the above-mentioned patent applications is hereby incorporated by reference herein and made a part of this specification.

BACKGROUND OF THE INVENTION

1. Field of the Invention

The present invention relates to a charging station for charging an unmanned vehicle and a charging station module including a plurality of charging stations.

2. Description of Related Art

An unmanned aerial vehicle (UAV) can be broadly applied in various tasks, including detection of environmental data, patrol or investigation in specific regions, national conservation, emergency search and rescue, meteorological observation and communication relay. One of the advantages of the UAV is that the UAV can be remotely operated in substitution for manpower. In addition, the UAV can perform tasks in environments inaccessible by human or even can perform controls out of a line of sight. However, a battery life is one of the bottlenecks that may occur to the application of the UAVs. Currently available UAVs have to return to supply stations within a specified time period for battery replacement or charging.

Accordingly, a UAV charging station with capability of rapidly charging has been developed recently, so as to facilitate the UAVs to continuously perform various tasks, which is one of the current important development objects. etc.

SUMMARY OF THE INVENTION

The present invention provides a charging station adapted to bear an unmanned vehicle. The charging station includes a platform and a charging mechanism. The charging mechanism is disposed on the platform and adapted to be electrically connected to a conductive structure of the unmanned vehicle by a movement over the platform. When the unmanned vehicle is docked on the platform, the conductive structure and the charging mechanism are located within a range of the platform, and a height of the conductive structure and a height of the charging mechanism correspond to each other with respect to the platform.

The invention provides a charging station module adapted to bear a plurality of unmanned vehicles. The charging station module includes a plurality of charging stations, and the charging stations are combined in an array. Each of the charging stations is adapted to bear one of the unmanned vehicles. Each of the charging stations includes a platform and a charging mechanism. The charging mechanism is disposed on the platform and adapted to be electrically connected to a conductive structure of the unmanned vehicle by a movement over the platform. When the unmanned vehicle is docked on the platform, the conductive structure and the charging mechanism are located within a range of the platform, and a height of the conductive structure and a height of the charging mechanism correspond to each other with respect to the platform.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

An embodiment of the invention provides a charging station adapted to bear an unmanned vehicle. The charging station includes a platform and a charging mechanism. The charging mechanism is disposed on the platform and electrically connected to the unmanned vehicle for charging by a two-dimensional movement over the platform.

In the embodiment of the invention, a position for charging is adjustable on the charging station, such that the charging station is adapted to various types of unmanned vehicles and can contribute to improving use efficiency and use range of the unmanned vehicles. In an exemplary embodiment, the charging station may further includes a base besides the platform and the charging mechanism. The base is disposed on a bottom portion of the platform and configured to be adapted to various terrains to stabilize an overall operation of the entire platform. The base may, for example, use a plurality of stands. The charging mechanism is disposed on the platform and may be electrically connected to the unmanned vehicle for charging.

In one or part of a plurality of exemplary embodiments of the invention, the platform is a conductor and electrically connected to the unmanned vehicle. The charging mechanism includes a driving motor and a moving electrode. The moving electrode is coupled to the driving motor, and when the driving motor is turned on, the moving electrode moves over the platform to be electrically connected to a conductive structure of the unmanned vehicle.

In one or part of a plurality of exemplary embodiments of the invention, the moving electrode provides a first voltage to the unmanned vehicle, and the platform provides a second voltage to the unmanned vehicle.

In one or part of a plurality of exemplary embodiments of the invention, when the driving motor is turned on, the moving electrode is driven by the driving motor to rotate over the platform.

In one or part of a plurality of exemplary embodiments of the invention, the charging mechanism includes a first driving motor, a second driving motor, a first moving electrode and a second moving electrode. The first driving motor is disposed on the platform, and the second driving motor is disposed on the platform. The first moving electrode is coupled to first driving motor, and when the first driving motor is turned on, the first moving electrode moves toward a first direction over the platform to be electrically connected to the conductive structure of the unmanned vehicle. The second moving electrode is coupled to second driving motor, and when the second driving motor is turned on, the second moving electrode moves toward a second direction over the platform to be electrically connected to the conductive structure of the unmanned vehicle.

In one or part of a plurality of exemplary embodiments of the invention, the first moving electrode provides the first voltage to the unmanned vehicle, and the second moving electrode provides the second voltage to the unmanned vehicle.

In one or part of a plurality of exemplary embodiments of the invention, when the first driving motor is turned on, the first moving electrode is driven by the first driving motor to rotate over the platform, and when the second driving motor is turned on, the second moving electrode is driven by the second driving motor to rotate over the platform.

In one or part of a plurality of exemplary embodiments of the invention, the charging mechanism includes a driving motor and a moving electrode. The moving electrode is coupled to the driving motor, and when the driving motor is turned on, the moving electrode moves over the platform to provide the first voltage and the second voltage to the unmanned vehicle.

In one or part of a plurality of exemplary embodiments of the invention, at least one stand is further included. The at least one stand is disposed on the bottom portion of the platform.

In one or part of a plurality of exemplary embodiments of the invention, the platform further includes an airflow guiding structure, and the unmanned vehicle includes a plurality of holders. A spacing distance is between any two of the holders, and the spacing distance is greater than a diameter of the airflow guiding structure.

In one or part of a plurality of exemplary embodiments of the invention, the airflow guiding structure is a hole or a mesh formed on the platform.

In one or part of a plurality of exemplary embodiments of the invention, an air-exhaustion device is further included. The air-exhaustion device is disposed in the airflow guiding structure and configured to exhaust a downward airflow occurring when the unmanned vehicle is landed.

In one or part of a plurality of exemplary embodiments of the invention, a guiding device is further included. The guiding device is disposed in the platform and transmits an optical message to guide the unmanned vehicle to dock on the platform.

In one or part of a plurality of exemplary embodiments of the invention, the conductive structure of the unmanned vehicle includes a first conductive ring and a second conductive ring. The first moving electrode is electrically connected to the first conductive ring to provide the first voltage to the unmanned vehicle, and the second moving is electrode electrically connected to the second conductive ring to provide the second voltage to the unmanned vehicle.

In one or part of a plurality of exemplary embodiments of the invention, a height of the first conductive ring with respect to the platform corresponds to the height of the first moving electrode with respect to the platform, such that a surface of the first conductive ring completely or partially contacts the first moving electrode. A height of the second conductive ring with respect to the platform corresponds to the height of the second moving electrode with respect to the platform, such that a surface of the second conductive ring completely or partially contacts the second moving electrode.

In one or part of a plurality of exemplary embodiments of the invention, a load cell is further included. The load cell is disposed under or inside the platform and configured to measure a weight of an object borne on the platform.

In one or part of a plurality of exemplary embodiments of the invention, a charging station cover is further included. The charging station has a main body, at least one bearing board and a supporting structure. The main body has an accommodation space, and the at least one bearing board is disposed inside the accommodation space of the main body. The platform is disposed on the at least one bearing board, the unmanned vehicle is located in the accommodation space, and the supporting structure is disposed on a bottom portion of the main body.

In one or part of a plurality of exemplary embodiments of the invention, the supporting structure includes a plurality of moving wheels.

Based on the above, the charging station of the invention has a movable charging mechanism of which the position may be arbitrarily adjusted on the platform. When the unmanned vehicle is docked on the platform of the charging station, the charging mechanism is moved to contact the unmanned vehicle for charging. The charging station of the invention does not require the unmanned vehicle to be docked at a specific position on the platform, but coordinates the charging mechanism with the docking position of the unmanned vehicle. As such, the unmanned vehicle does not have to be manually or accurately aligned, such that the time spent in the landing process can be reduced. Thus, the use efficiency of the unmanned vehicle can be enhanced.

An embodiment of the invention provides a charging station module adapted to bear and charge a plurality of unmanned vehicles. In an exemplarily embodiment of the invention, a plurality of charging stations are combined in an array.

In one or part of a plurality of exemplary embodiments of the invention, the platform of each of the charging stations presents a hexagonal shape, and the platforms abut against one another to form a honeycomb-like appearance.

Based on the above, in the charging station module of the invention, the platform of each charging station presents a hexagonal shape, the platforms can abut against one another to combine a plurality of charging stations. In this way, multiple unmanned vehicles can be simultaneously docked on one charging station module and charged. Thereby, the use of the charging stations can be extended.

Figure 1A:
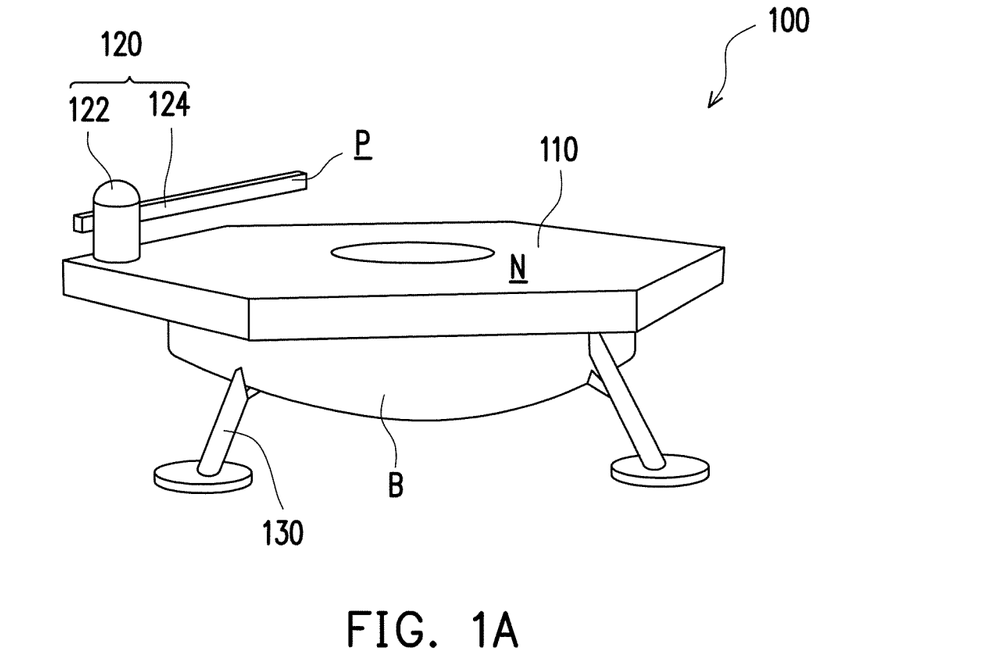
FIG. 1A is a schematic three-dimensional (3D) diagram illustrating a charging station according to an embodiment of the invention.
Figure 2:
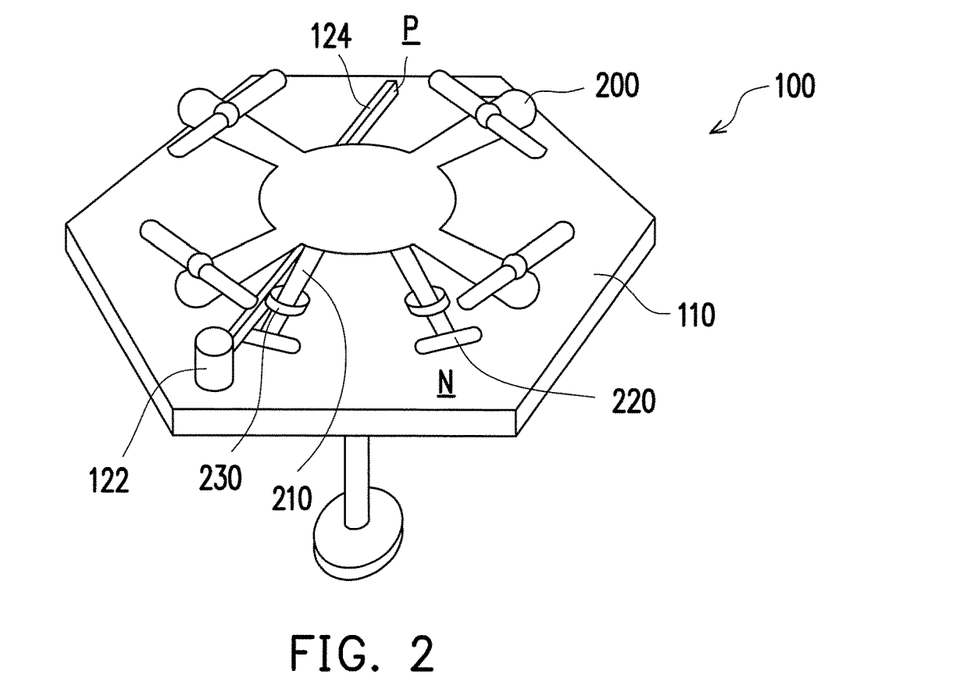
FIG. 2 is a schematic diagram of charging an unmanned vehicle docked on the charging station depicted in FIG. 1A.

FIG. 1A is a schematic three-dimensional (3D) diagram illustrating a charging station according to an embodiment of the invention. FIG. 2 is a schematic diagram of charging an unmanned vehicle docked on the charging station depicted in FIG. 1A. Referring to FIG. 1A and FIG. 2 first, a charging station 100 of the present embodiment is adapted for an unmanned vehicle 200 to be docked thereon for a charging operation. The unmanned vehicle 200 includes a plurality of holders 210, 220 and a conductive structure. In present embodiment, the conductive structure is disposed on the holders 210, 220 respectively. Here, the conductive structure includes, for example, two conductive rings 230 sleeved on the holders 210, 220. In an embodiment, the two conductive rings 230 are, for example, directly formed on the holders 210, 220.

To be detailed, the conductive structure is, for example, made of a copper sheet and a spring and thus, has elasticity. The conductive structure is a movable structure (capable of, for example, moving along each holder or turning on the holder) or a fixed structure, such that the conductive structure may achieve maximizing a contact area with external electrodes by adjusting an angle (for example, the conductive structure is a polygon shape/post and is adjusted to allow the external electrodes to entirely or mostly contact a side of the polygon shape/post), which is in favor for increasing charging efficiency.

Referring to FIG. 1A and FIG. 2, the charging station 100 of the present embodiment includes a platform 110, a charging mechanism 120 and at least one stand 130. The charging mechanism 120 is disposed on the platform 110 and configured to be electrically connected to the conductive structure of the unmanned vehicle 200. In brief, when the unmanned vehicle 200 is docked on the platform 110, the conductive structure and the charging mechanism 120 are within a range of the platform 110, and heights of the conductive structure and the charging mechanism 120 correspond to each other with respect to the platform 110. The charging mechanism 120 is adapted to move over the platform 110 (for example, linearly move, turn, stretch or translate over the platform 110), so as to be electrically connected to the conductive structure. In this case, one end of the charging mechanism 120 is, for example pivoted onto the platform 110, and then, the other end of the charging mechanism 120 may be turned and directionally changed. In an embodiment, the charging mechanism 120 is adapted to move with a degree of freedom over the platform 110. For example, in this case, the charging mechanism 120 may be a telescopic structure, such that the charging mechanism 120 is capable of elongating or shortening in a unidirectional manner over the platform 110. In an embodiment, the heights of the conductive structure and the charging mechanism 120 corresponding to each other with respect to the platform 110 may allow the charging mechanism 120 to move toward the conductive structure, such that the charging mechanism 120 and the conductive structure may be completely or partially connected with each other.

When the unmanned vehicle is landed, the charging mechanism 120 is moved toward the unmanned vehicle 200 and contacts the conductive rings 230 to form a loop and automatically (or is controlled to) charge the unmanned vehicle 200. In this case, the number of the at least one stand 130 is plural. The plurality of stands 130 are disposed on a bottom portion B of the platform 110, and each of the stand 130 may be independently lifted to be adapted to rugged roadway or ground, such that the platform 110 may be kept in a horizontal state. In other embodiments, the stands 130 may be replaced by moving wheels, such that the charging station 100 may be moved easily. The number of the at least one stand 130 may also be one, and the stand 130 is a columnar structure formed under the platform 110.

To be detailed, in an embodiment, the platform 110 is, for example, a conductor and may be electrically connected to the first holder 210 and/or the second holder 220 of the unmanned vehicle 200, so as to be defined as at a zero potential. The charging mechanism 120 includes a driving motor 122 and a moving electrode 124. The driving motor 122 is disposed on the platform 110, and the moving electrode 124 is coupled to the driving motor 122. In other embodiments, the driving motor 122 is, for example, directly or indirectly connected with the platform 110. When the driving motor 122 is turned on, the moving electrode 124 moves with a degree of freedom over the platform 110, so as to be electrically connected to the conductive rings 230 of the unmanned vehicle 200. In present embodiment, the moving electrode 124 is, for example, a cantilever. Further, the moving electrode 124 provides a first voltage to the unmanned vehicle 200, the platform 110 provides a second voltage to the unmanned vehicle 200, the first voltage is a positive power supply P, and the second voltage is a ground N. In an embodiment, the moving electrode 124 is, for example, telescopic and includes a cantilever and a support shaft. The cantilever is a conductor made of, for example, a copper material. When the driving motor 122 is turned on, the support shaft of the moving electrode 124 is driven by the driving motor 122 to turn, such that the cantilever of the moving electrode 124 contacts the conductive rings 230 of the unmanned vehicle 200.

Figure 1B:
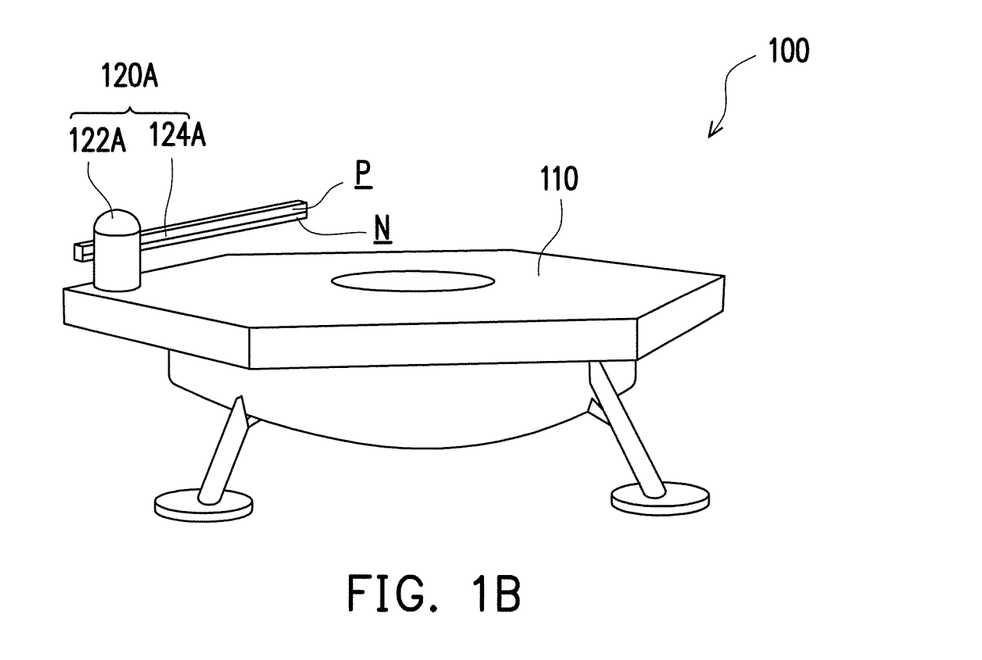
FIG. 1B is a schematic 3D diagram illustrating a charging station according to another embodiment of the invention.

FIG. 1B is a schematic 3D diagram illustrating a charging station according to another embodiment of the invention. In the embodiment illustrated in FIG. 1B, the charging mechanism 120A includes a driving motor 122A and a moving electrode 124A. The driving motor 122A is disposed on the platform 110, and the moving electrode 124A is coupled to the driving motor 122A. The moving electrode 124A provides a first voltage and a second voltage, the first voltage is a positive power supply P, and the second voltage is a ground N.

In brief, in the present embodiment, the unmanned vehicle 200 may be landed and docked on the platform 110 of the charging station 100, and the driving motor 122 of the charging mechanism 120 drives the moving electrode 124 to move toward the unmanned vehicle 200 and contact the conductive structure. In this way, the moving electrode 124 of the charging mechanism 120 may be correspondingly moved on the charging station 100 of the present embodiment according to a position on the platform 110 where the unmanned vehicle 200 is landed, thereby performing a charging operation. Thus, the unmanned vehicle 200 may be charged, without having to be docked at a specific position on the platform 110, thereby enhancing use efficiency of the unmanned vehicle 200.

It should be noted that, in the embodiments described below, element labels and portions of the previous embodiments are referenced hereinafter, and the same or similar elements are indicated by the same or similar reference labels. The descriptions of the same technical details are therefore not repeated hereinafter. The parts omitted from description may be referenced from the afore-described embodiments and are not repeated in the embodiments below.

Figure 3:
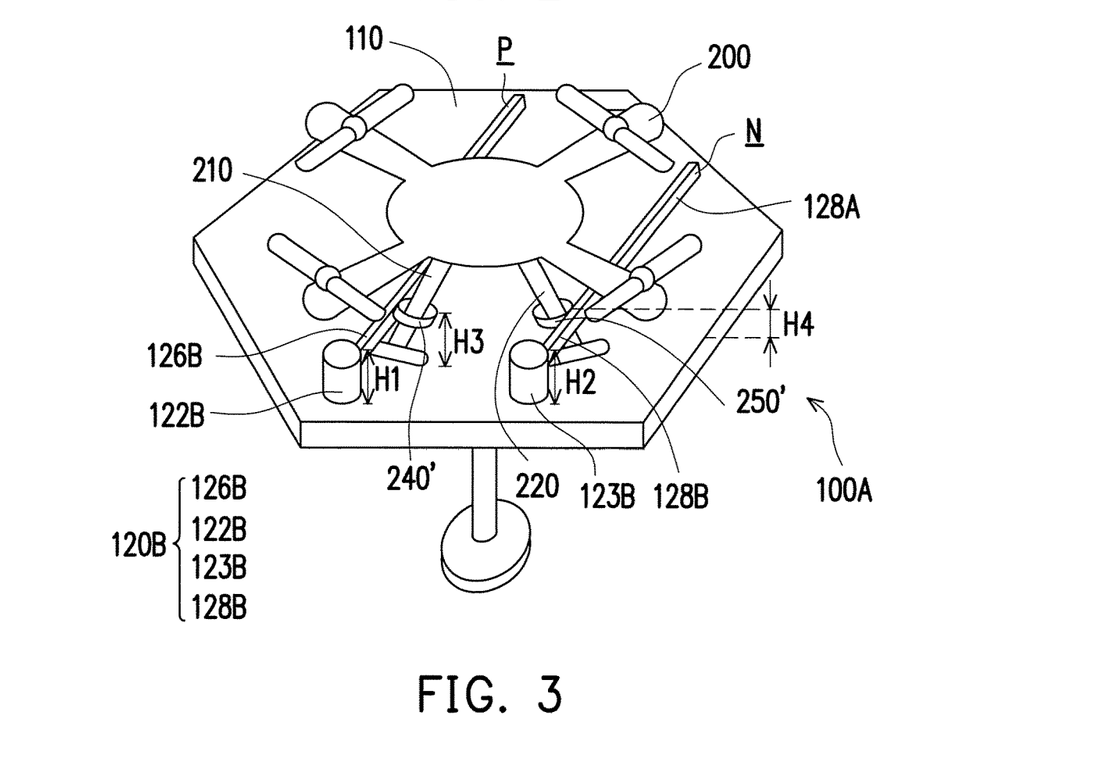
FIG. 3 is a schematic 3D diagram illustrating a charging station according to another embodiment of the invention.

FIG. 3 is a schematic 3D diagram illustrating a charging station according to another embodiment of the invention. Referring to FIG. 1A and FIG. 3 simultaneously, the platform 110 in the embodiment illustrated in FIG. 3 is, for example, a non-conductor, and a charging mechanism 120B includes a first driving motor 122B, a second driving motor 123B, a first moving electrode 126B and a second moving electrode 128B. Additionally, the conductive structure of the unmanned vehicle 200 includes a first conductive ring 240' and a second conductive ring 250'. Referring to FIG. 3, heights H1 to H4 are respectively straight distances from highest points of the first moving electrode 126B, the second moving electrode 128B, the first conductive ring 240' and the second conductive ring 250' to the platform 110. In present embodiment, the first conductive ring 240' disposed on the unmanned vehicle 200 has the height H3 with respect to the platform 110 which is equal to the height H1 of the first moving electrode 126B with respect to the platform 110, and the second conductive ring 250' disposed on the unmanned vehicle 200 has the height H4 with respect to the platform 110 which is equal to the height H2 of the second moving electrode 128B with respect to the platform 110. In present embodiment, the height H3 and height H1 are substantially the same, such that a surface of the first conductive ring 240' completely contacts the first moving electrode 126B. Similarly, the height H4 and the height H2 are substantially the same, such that a surface of the second conductive ring 250' completely contacts the second moving electrode 128B.

In an embodiment, the height H3 and the height H1 are different (for example, the height H3 is greater than the height H1, or the height H3 is less than the height H1), or widths of the first conductive ring 240' and the first moving electrode 126B are different, such that after the first conductive ring 240' is joined with the first moving electrode 126B, the surface of the first conductive ring 240' partially contacts the first moving electrode 126B, and the highest point of the first conductive ring 240' is higher or lower than the highest point of the first moving electrode 126B. Similarly, the height H4 and the height H2 are different (for example, the height H4 is greater than the height H2, or the height H4 is less than the height H2), or widths of the second conductive ring 250' and the second moving electrode 128B are different, such that after the second conductive ring 250' is joined with the second moving electrode 128B, the surface of the second conductive ring 250' partially contacts the second moving electrode 128B, and the highest point of the second conductive ring 250' is higher or lower than the highest point of the second moving electrode 128B.

To be detailed, the platform 110 bears the unmanned vehicle 200, and the first driving motor 122B and the second driving motor 123B are respectively disposed at corners on the platform 110 or respectively connected with the platform, for example. The first moving electrode 126B is coupled to the first driving motor 122B, and when being turned on, the first driving motor 122B drives the first moving electrode 126B to move toward a first direction (for example, linearly move, turn, stretch or translate over the platform 110) over the platform 110, so as to be electrically connected to the first conductive ring 240' of the unmanned vehicle 200. The second moving electrode 128B is coupled to the second driving motor 123B, and when being turned on, the second driving motor 123B drives the second moving electrode 128B to move toward a second direction (for example, linearly move, turn, stretch or translate over the platform 110) over the platform 110, so as to be electrically connected to the second conductive ring 250' of the unmanned vehicle 200. Further, the first moving electrode 126B provides a first voltage to the unmanned vehicle 200, and the second moving electrode 128B provides a second voltage to the unmanned vehicle 200. The first voltage is a positive power supply P, and the second voltage is a ground N. In an embodiment, the first direction and the second direction may be different. For example, the first direction may be a counterclockwise turning direction, and the second direction may be a clockwise turning direction. In an embodiment, the first direction and the second direction may be the same. For example, both the first direction and the second direction may be a clockwise turning direction.

Figure 4:
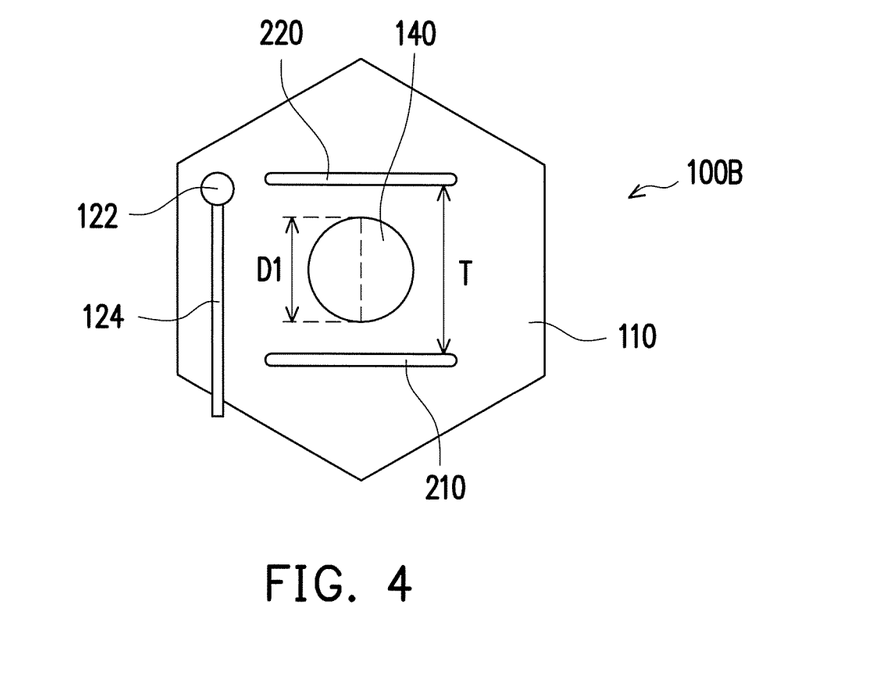
FIG. 4 is a schematic 3D diagram illustrating a charging station according to an embodiment of the invention.

FIG. 4 is a schematic 3D diagram illustrating a charging station according to an embodiment of the invention. Referring to FIG. 1A and FIG. 4 simultaneously, a charging station 100B of the embodiment illustrated in FIG. 4 further includes an airflow guiding structure 140. The airflow guiding structure 140 is a hole formed on the platform 110 and has a diameter D1. In an embodiment, a spacing distance T is between any two of the holders (e.g., 210, 220) of the unmanned vehicle 200. The spacing distance T is greater than the diameter D1 of the airflow guiding structure, and a length of each holder is also greater than the diameter D1, thereby preventing the unmanned vehicle 200 from dropping into the airflow guiding structure 140. To be detailed, the airflow guiding structure 140 is configured to exhaust a downward airflow occurring when the unmanned vehicle 200 is landed, so as to weaken a rebound airflow and improve landing stability for the unmanned vehicle 200. In an embodiment, referring to FIG. 3 and FIG. 4 simultaneously, the charging station 100A may also include the airflow guiding structure 140.

Figure 5:
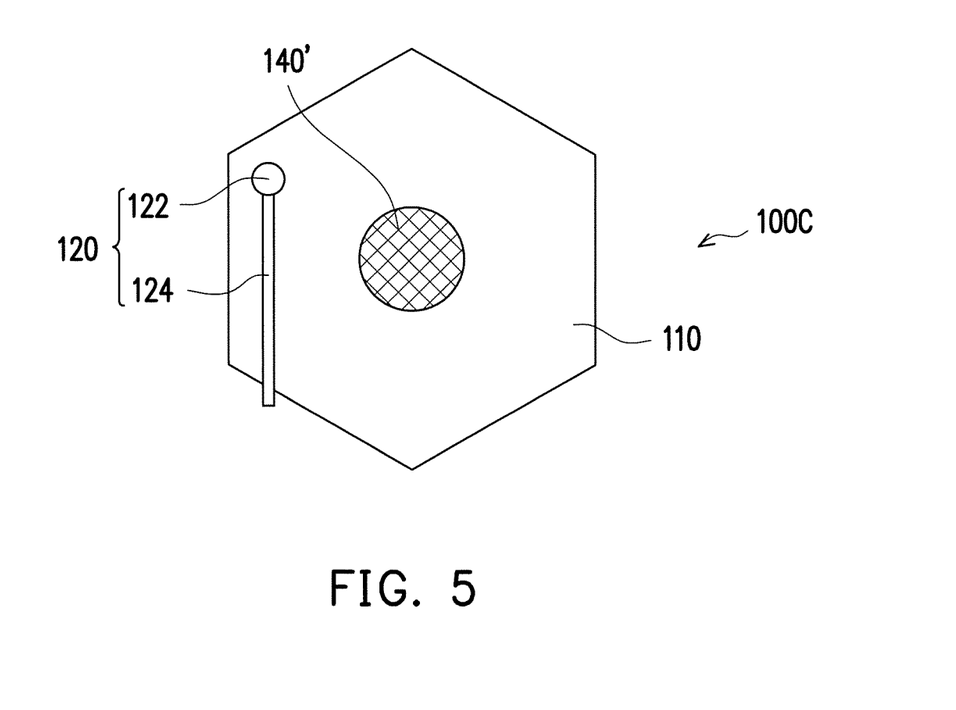
FIG. 5 is a schematic 3D diagram illustrating a charging station according to an embodiment of the invention.

FIG. 5 is a schematic 3D diagram illustrating a charging station according to an embodiment of the invention. Referring to FIG. 4 and FIG. 5 simultaneously, an airflow guiding structure 140' of the embodiment illustrated in FIG. 5 is a mesh formed on the platform 110.

Figure 6:
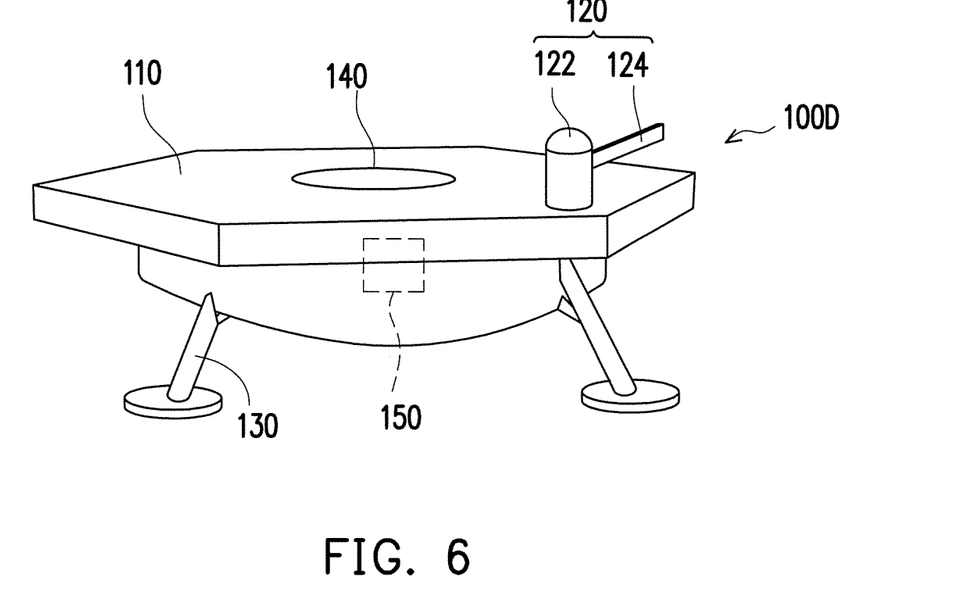
FIG. 6 is a schematic 3D diagram illustrating a charging station according to an embodiment of the invention.

FIG. 6 is a schematic 3D diagram illustrating a charging station according to an embodiment of the invention. Referring to FIG. 4 and FIG. 6 simultaneously, a charging station 100D of the embodiment illustrated in FIG. 6 further includes an air-exhaustion device 150. The air-exhaustion device 150 is disposed in the airflow guiding structure 140 and located in the center of the platform 110. The air-exhaustion device 150 may contribute to enhancing the airflow guiding structure 140 in guiding the downward airflow to further improve the landing stability for the unmanned vehicle.

Figure 7:
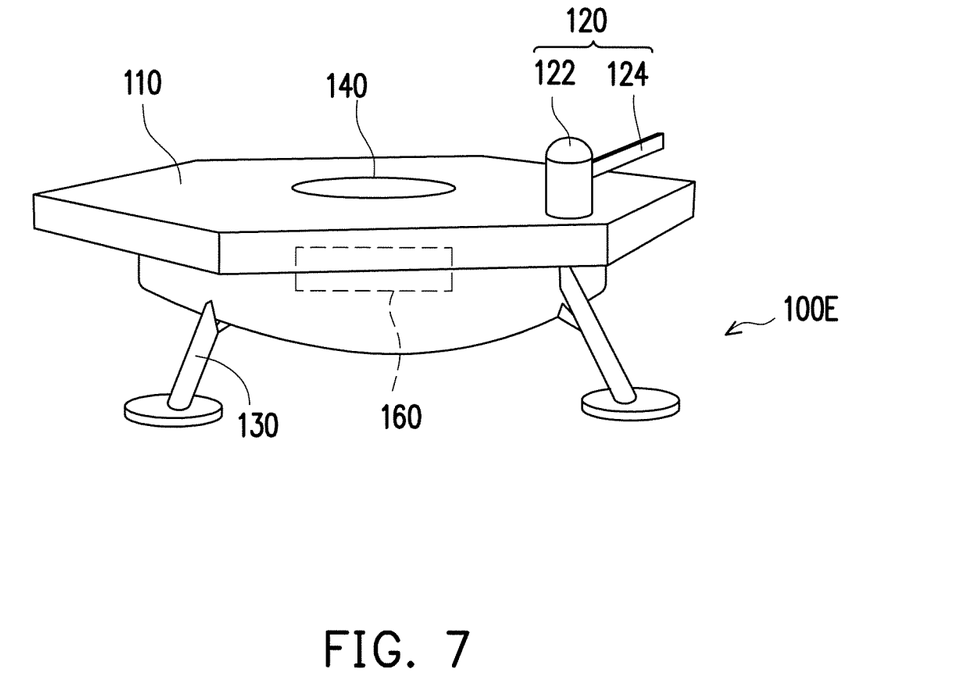
FIG. 7 is a schematic 3D diagram illustrating a charging station according to an embodiment of the invention.

FIG. 7 is a schematic 3D diagram illustrating a charging station according to an embodiment of the invention. A charging station 100E of the embodiment illustrated in FIG. 7 further includes a guiding device 160. The guiding device 160 is disposed in the platform 110 and configured to transmit an optical signal through the airflow guiding structure 140 to guide the unmanned vehicle 200 to dock on the platform 110. In this case, a signal transmission range of the guiding device 160 corresponds to that of the airflow guiding structure 140, thereby transmitting the signal from the airflow guiding structure 140 to the outside of the platform 110. To be detailed, when the unmanned vehicle flies over or near the top of the charging station, the guiding device, for example, transmits an infrared (IR) signal to an IR receiver of the unmanned vehicle, so as to guide the unmanned vehicle to a landing position on the platform. In an embodiment, a region on the platform corresponding to the transmission range of the guiding device is, for example, hollow or made of a transparent material, such that the guiding device may transmit the IR signal to the outside of the platform.

In other embodiments, in an application scenario where a plurality of charging stations are combined, the guiding device, for example, transmits a totem (which is specifically encoded or has a glittering frequency), such that each charging station has a unique recognition signal for distinguishing from one another, and a plurality of sets of guiding totems are created in this way. For example, each charging station has different sets of guiding totems. To be detailed, for example, one charging station has one set of guiding totem, one set includes one or more patterns, such as a first pattern, a second pattern and a third pattern, and a totem is transmitted by cyclically transmitting the first pattern, the second pattern and the third pattern in sequence, where an transmission interval may be a specific time period, e.g., a pattern per second. When multiple unmanned vehicles are to be landed, each unmanned vehicle may be landed on the correct charging station by recognizing its corresponding totem set.

Figure 8A:
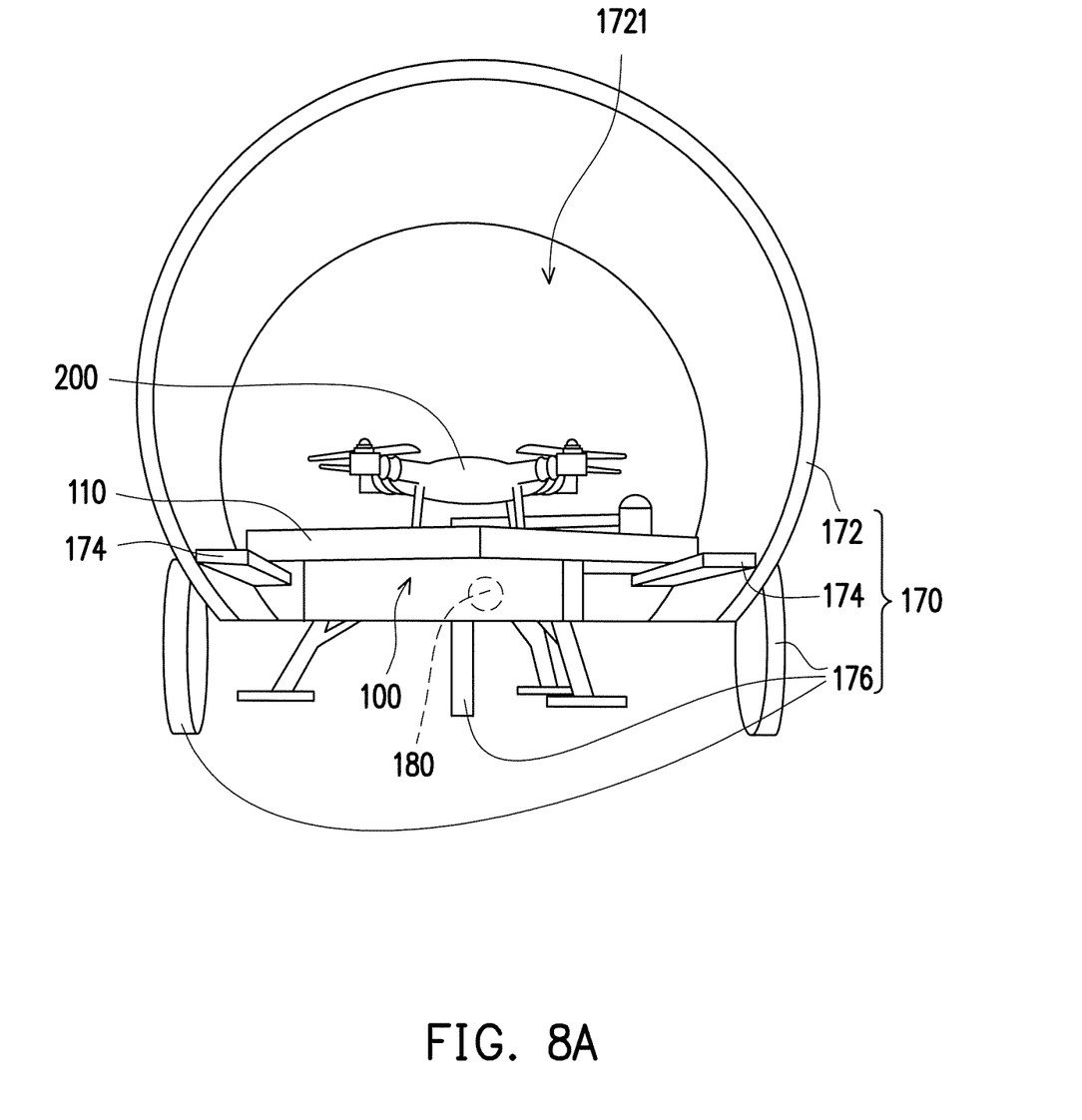
FIG. 8A is a schematic 3D diagram illustrating a charging station cover bearing a bear charging station according to an embodiment of the invention.

FIG. 8A is a schematic 3D diagram illustrating a charging station cover bearing a bear charging station according to an embodiment of the invention. Referring to FIG. 8A, a charging station cover 170 having a main body 172, at least one bearing board 174 and a supporting structure 176 is further included. The main body 172 has an accommodation space 1721. The main body 172 is configured to isolate interference from an external environment and form a relatively stable measurement environment. The at least one bearing board 174 is disposed inside the accommodation space 1721 of the main body 172. In present embodiment, the number of the at least one bearing board 174 is, for example, two, and the bearing boards 174 are disposed opposite to each other inside the accommodation space 1721 of the main body 172. The supporting structure 176 is disposed on a bottom portion of the main body 172. In present embodiment, the supporting structure 176 includes, for example, a plurality of wheels in favor for moving, but the invention is not limited thereto, and the supporting structure 176 may include, for example, a plurality of adjustable stands applicable to be used on rugged roadway, such that the charging station cover may be kept horizontal with respect to the ground. In an embodiment, the number of the at least one bearing board 174 is, for example, one, and the bearing board 174 is disposed round inside the accommodation space 1721 of the main body 172.

Referring to FIG. 8A, the charging station 100 further includes at least one load cell 180 disposed under the platform 110. The load cell 180 is configured to measure a weight of an object borne on the platform 110. In this case, the load cell 180 may be configured to detect a propeller power of the unmanned vehicle 200. The platform 110 of the charging station 100 is disposed on the two bearing boards 174, the unmanned vehicle 200 is located still inside the accommodation space 1721, and thereby, the load cell 180 measures an overall weight of the unmanned vehicle 200 on the platform 110. In this circumstance, each propeller of the unmanned vehicle 200 is sequentially turned on, and a lift force generated by each propeller carries a part of the weight of the unmanned vehicle 200, such that the overall weight of the unmanned vehicle 200 in operation which is measured by the load cell 180 is less than the overall weight of the unmanned vehicle 200 in the still state. A power value of each propeller of the unmanned vehicle 200 may be inferred by subtracting the overall weight in the operation state from the overall weight in the still state, and whether abnormality occurs to each propeller of the unmanned vehicle 200 may be determined according to the power value. In an embodiment, the value obtained by subtracting the overall weight in the operation state from the overall weight in the still state is compared with a power value threshold. If the value is greater than the power value threshold, it is determined that the propeller is normal, and if the value is not greater than the power value threshold, it is determined that abnormality occurs to the propeller. In another embodiment, all the propellers may be simultaneously turned on, and the value obtained by subtracting the overall weight in the operation state from the overall weight in the still state is compared with a total power value threshold. If the value is greater than the total power value threshold, it is determined that all the propellers are normal, and if the value is not greater than the total power value threshold, it is determined that abnormality occurs to at least one of the propellers.

Figure 8B:
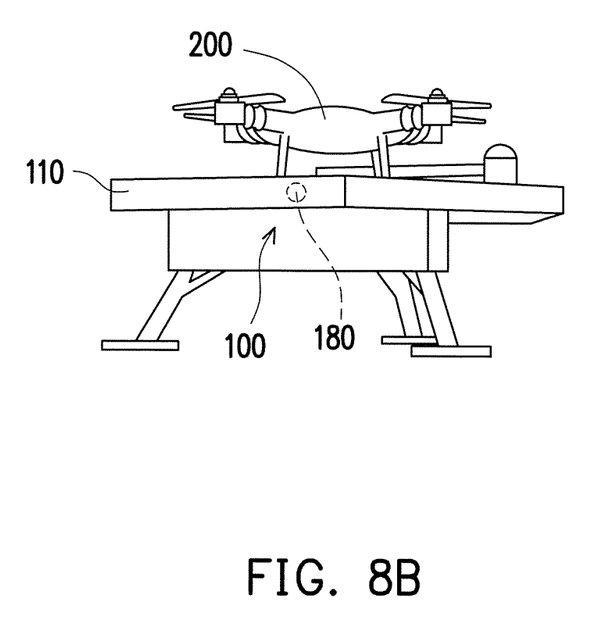
FIG. 8B is a schematic 3D diagram illustrating that the charging station cover is removed from the charging station depicted in FIG. 8A.

In another embodiment, referring to FIG. 8B, the charging station 100 includes the load cell 180 disposed inside the platform 110. When the unmanned vehicle 200 is docked on the platform 110 or performs a charging process, the load cell 180 is configured to measure the weight of the unmanned vehicle 200 on the platform 110. The load cell 180 may be configured to detect the propeller power of the unmanned vehicle 200. When the unmanned vehicle 200 is located still on the platform 110, the load cell 180 measures the overall weight of the unmanned vehicle 200 on the platform 110. In this circumstance, each propeller of the unmanned vehicle 200 is sequentially turned on, and a lift force generated by each propeller carries a part of the weight of the unmanned vehicle 200, such that the overall weight of the unmanned vehicle 200 in operation which is measured by the load cell 180 is less than the overall weight of the unmanned vehicle 200 in the still state. The power value of each propeller of the unmanned vehicle 200 may be inferred by subtracting the overall weight in the operation state from the overall weight in the still state, and whether abnormality occurs to each propeller of the unmanned vehicle 200 may be determined according to the power value. In an embodiment, the value obtained by subtracting the overall weight in the operation state from the overall weight in the still state is compared with a power value threshold. If the value is greater than the power value threshold, it is determined that the propeller is normal, and if the value is not greater than the power value threshold, it is determined that abnormality occurs to the propeller. In another embodiment, all the propellers may be simultaneously turned on, and the value obtained by subtracting the overall weight in the operation state from the overall weight in the still state is compared with a total power value threshold. If the value is greater than the total power value threshold, it is determined that all the propellers are normal, and if the value is not greater than the total power value threshold, it is determined that abnormality occurs to at least one of the propellers. In another embodiment, the load cell 180 is disposed under the platform 110. In an embodiment, the charging mechanism of the charging station 110 disposed with the load cell 180, the airflow guiding structure 140 and/or the air-exhaustion device 150 is not limited to be implemented as a moving electrode and/or a motor and may be implemented in other forms. For example, the unmanned vehicle 200 may be charged by a first voltage and a second voltage provided at different positions on the platform 110 or may be charged in a wireless manner.

Figure 9:
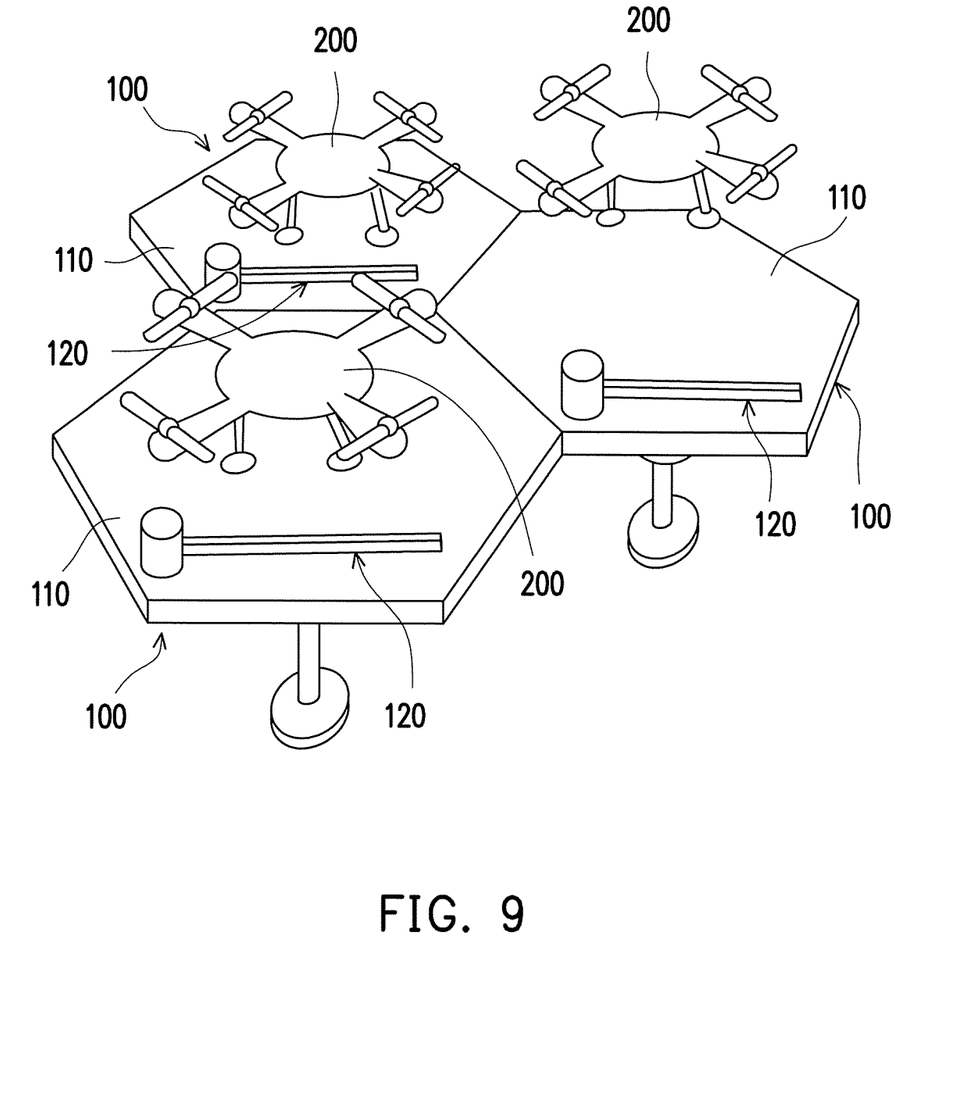
FIG. 9 is a schematic 3D diagram illustrating a charging station module according to an embodiment of the invention.

FIG. 9 is a schematic 3D diagram illustrating a charging station module according to an embodiment of the invention. Referring to FIG. 9, a charging station module 300 includes a plurality of charging stations 100 and is adapted to bear a plurality of unmanned vehicles 200. The charging stations 100 are combined in an array. To be detailed, the platform 110 of each charging station 100 presents a hexagonal shape, and each edge of the platform 110 may abut against another platform 110. In present embodiment, taking three platforms 110 for example, two adjacent edges of a first platform 110 respectively abut against a second platform 110 and a third platform 110, while the second platform 110 and the third platform 110 also abut against each other. Thereby, a honeycomb-like appearance is formed. The charging station module 300 may be provided for simultaneously landing and charging a plurality of unmanned vehicles 200 or for bearing a large-size unmanned vehicle 200.

In light of the foregoing, the charging station of the invention has a movable charging mechanism of which the position can be arbitrarily adjusted on the platform. When the unmanned vehicle is docked on the platform of the charging station, the charging mechanism is moved to contact the unmanned vehicle for charging. The charging station of the invention does not require the unmanned vehicle to be docked at a specific position on the platform, but coordinate the charging mechanism with the docking position of the unmanned vehicle. As such, the unmanned vehicle does not have to be manually or accurately aligned, such that the time spent in the landing process can be reduced. Thus, the use efficiency of the unmanned vehicle can be enhanced. Additionally, the airflow guiding structure, for example, in a hole or a mesh form, disposed on the platform, or the air-exhaustion device disposed on the platform can contribute to guiding the downward airflow of the unmanned vehicle when being landed and contribute to weakening the rebound airflow, so as to improve the landing stability for the unmanned vehicle. Moreover, the load cell can be configured to detect whether abnormality occurs to each propeller of the unmanned vehicle, thereby preventing the unmanned vehicle from being damaged. Further, the charging station module of the invention can be adapted to charge a plurality of unmanned vehicles or bear a large-size unmanned vehicle, and thus, the charging station module can be widely used.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A charging station, adapted to bear an unmanned vehicle, comprising:
   a platform; and
   a charging mechanism, disposed on the platform and adapted to be electrically connected to a conductive structure of the unmanned vehicle by a movement over the platform, wherein when the unmanned vehicle is docked at a position which is not specified in advance on the platform, the conductive structure and the charging mechanism are located within a range of the platform, and a height of the conductive structure and a height of the charging mechanism correspond to each other with respect to the platform,
   wherein the charging mechanism comprises:
   a first driving motor, disposed on the platform;
   a first moving electrode, coupled to the first driving motor and moving toward a first direction over the platform to be electrically connected to the conductive structure of the unmanned vehicle when the first driving motor is turned on; and
   when the first driving motor is turned on, the first moving electrode is driven by the first driving motor to rotate over the platform.

2. The charging station as recited in claim 1, wherein the platform is a conductor and configured to be electrically connected to the unmanned vehicle.

3. The charging station as recited in claim 2, wherein the first moving electrode provides a first voltage to the unmanned vehicle, and the platform provides a second voltage to the unmanned vehicle.

4. The charging station as recited in claim 1, wherein The charging mechanism comprises:
   a second driving motor, disposed on the platform;
   a second moving electrode, coupled to the second driving motor and moving toward a second direction over the platform to be electrically connected to the conductive structure of the unmanned vehicle when the second driving motor is turned on.

5. The charging station as recited in claim 4, wherein the first moving electrode provides a first voltage to the unmanned vehicle, and the second moving electrode provides a second voltage to the unmanned vehicle.

6. The charging station as recited in claim 4, wherein when the second driving motor is turned on, the second moving electrode is driven by the second driving motor to rotate over the platform.

7. The charging station as recited in claim 1, wherein when the first driving motor is turned on, the first moving electrode provides a first voltage and a second voltage to the unmanned vehicle, wherein the first voltage and the second voltage are different from each other.

8. The charging station as recited in claim 1, further comprising at least one stand disposed on a bottom portion of the platform.

9. The charging station as recited in claim 1, wherein the platform further comprises an airflow guiding structure, the unmanned vehicle comprises a plurality of holders, a spacing distance is between any two of the holders, and the spacing distance is greater than a diameter of the airflow guiding structure.

10. The charging station as recited in claim 9, wherein the airflow guiding structure is at least one hole or a mesh formed on the platform.

11. The charging station as recited in claim 9, further comprising an air-exhaustion device disposed in the airflow guiding structure and configured to exhaust a downward airflow occurring when the unmanned vehicle is landed.

12. The charging station as recited in claim 1, further comprising a guiding device disposed in the platform and transmitting an optical message to guide the unmanned vehicle to dock on the platform.

13. The charging station as recited in claim 4, wherein the conductive structure of the unmanned vehicle comprises a first conductive ring and a second conductive ring, the first moving electrode is electrically connected to the first conductive ring to provide a first voltage to the unmanned vehicle, and the second moving is electrode electrically connected to the second conductive ring to provide a second voltage to the unmanned vehicle.

14. The charging station as recited in claim 13, wherein a height of the first conductive ring with respect to the platform corresponds to the height of the first moving electrode with respect to the platform, such that a surface of the first conductive ring completely or partially contacts the first moving electrode, and a height of the second conductive ring with respect to the platform corresponds to the height of the second moving electrode with respect to the platform, such that a surface of the second conductive ring completely or partially contacts the second moving electrode.

15. The charging station as recited in claim 1, further comprising at least one load cell disposed under or inside the platform and configured to measure a weight of an object borne on the platform.

16. The charging station as recited in claim 1, further comprising a charging station cover having a main body, at least one bearing board and a supporting structure, the main body having an accommodation space, and the at least one bearing board being disposed inside the accommodation space of the main body, wherein the platform is disposed on the at least one bearing board, the unmanned vehicle is located in the accommodation space, and the supporting structure is disposed on a bottom portion of the main body.

17. The charging station as recited in claim 16, wherein the supporting structure comprises a plurality of moving wheels.

18. A charging station module, adapted to bear a plurality of unmanned vehicles and comprising a plurality of charging stations, wherein each of the charging stations is adapted to bear one of the unmanned vehicles, each of the charging station comprising:
a platform; and
a charging mechanism, disposed on the platform and adapted to be electrically connected to a conductive structure of the unmanned vehicle by a movement over the platform, wherein when the unmanned vehicle is docked at a position which is not specified in advance on the platform, the conductive structure and the charging mechanism are located within a range of the platform, and a height of the conductive structure and a height of the charging mechanism correspond to each other with respect to the platform,
wherein the charging stations are combined in an array,
wherein the charging mechanism comprises:
a first driving motor, disposed on the platform;
a first moving electrode, coupled to the first driving motor and moving toward a first direction over the platform to be electrically connected to the conductive structure of the unmanned vehicle when the first driving motor is turned on; and
when the first driving motor is turned on, the first moving electrode is driven by the first driving motor to rotate over the platform.

19. The charging station module as recited in claim 18, wherein the platform of each of the charging stations presents a hexagonal shape, and the platforms abut against one another to form a honeycomb-like appearance.

* * * * *